United States Patent [19]

Durant

[11] Patent Number: 5,400,595
[45] Date of Patent: Mar. 28, 1995

[54] BRAKE VALVE WITH PREFILL CHAMBER UNLOADING

[75] Inventor: Douglas M. Durant, Waterloo, Iowa
[73] Assignee: Deere & Company, Moline, Ill.
[21] Appl. No.: 201,548
[22] Filed: Feb. 25, 1994
[51] Int. Cl.⁶ .......................... F15B 7/00; B60T 11/28
[52] U.S. Cl. ........................................ 60/533; 60/589
[58] Field of Search ............... 60/533, 547.1, 549, 60/561, 562, 585, 588, 589

[56] References Cited

U.S. PATENT DOCUMENTS

| | | | |
|---|---|---|---|
| 4,128,249 | 12/1978 | Manzini et al. | 60/588 X |
| 4,155,223 | 5/1979 | Falk | 60/588 X |
| 4,671,168 | 6/1987 | Savvee et al. | 60/589 X |
| 4,738,109 | 4/1988 | Miller et al. | |
| 4,852,351 | 8/1989 | Price | 60/589 X |
| 5,159,871 | 11/1992 | Kehl | 60/589 X |

OTHER PUBLICATIONS

Eagles, D. M., "Hydraulic System of John Deere 7000 Series Tractors", Paper No. 931613, 14 Dec. 1993.

Primary Examiner—Edward K. Look
Assistant Examiner—Hoang Nguyen

[57] ABSTRACT

Left and right two stage brake valves communicate fluid pressure to left and right brake mechanisms. Each brake valve has an inlet for receiving pressurized brake fluid from a pump, a reservoir port, a stepped bore and a stepped piston member comprising a larger diameter prefill piston and a smaller diameter high pressure piston. The stepped piston is movable away from a rest position to transfer fluid to the brake mechanism. The stepped bore and the stepped piston form a high volume prefill chamber and a high pressure chamber. The high pressure piston has a groove communicated with the brake mechanism, and the groove communicates with the inlet when the high pressure piston has moved a certain distance to transfer fluid from the high pressure chamber to the brake mechanism. The prefill piston has a sealing land and a second land on either side of a sealing ring which is slidable in the stepped bore. The sealing land sealingly engages the sealing ring when the prefill piston moves to transfer fluid from the prefill chamber to the brake mechanism. The sealing land is spaced apart from the sealing ring by a distance which is greater than the distance between the groove and the inlet when the stepped piston is in its rest position.

1 Claim, 2 Drawing Sheets

BRAKE VALVE WITH PREFILL CHAMBER UNLOADING

BACKGROUND OF THE INVENTION

The invention relates to a brake control valve assembly which includes a pair of dual stage brake control valves.

A known dual stage brake control valve is described in U.S. Pat. No. 4,738,109, issued 19 Apr. 1988 and assigned to the assignee of this application. Such a brake valve provides the capability for manual braking when pump pressure is not available at the brake valve pump pressure inlet. This capability is achieved with a dual stage valve arrangement that includes a prefill piston and a high pressure piston. The prefill piston provides the large volume of oil and associated low hydraulic pressure required for engagement of the rear axle brake components. Once this volume is satisfied, the brake valve transitions from the larger prefill piston diameter to the smaller diameter high pressure piston in order to generate higher pressures required for braking.

With pump pressure available at the brake valve pump inlet, application of the brake valve (prefill piston/high pressure piston) requires only a small amount of travel from the neutral position to the pressure metering position. However, during this travel, fluid is substantially trapped and pressure is generated in the prefill chamber, resulting in a heavy pedal feel. The heavy pedal feel and associated higher pedal force required to apply the brake results in reduced control of the brake pressure due to the eventual pressure decay of the prefill chamber. This heavy pedal feel is more noticeable in cold weather conditions due to the increased pressure decay time.

SUMMARY OF THE INVENTION

Accordingly, an object of this invention is to provide a brake valve which does not have a heavy pedal feel.

This and other objects are achieved by the present invention, wherein left and right two stage brake valves communicate fluid pressure to left and right brake mechanisms. Each brake valve has an inlet for receiving pressurized brake fluid from a pump, a reservoir port, a stepped bore and a stepped piston member comprising a larger diameter prefill piston and a smaller diameter high pressure piston. The stepped piston is movable away from a rest position to transfer fluid to the brake mechanism. The stepped bore and the stepped piston form a high volume prefill chamber and a high pressure chamber. The high pressure piston has a groove communicated with the brake mechanism, and the groove communicates with the inlet when the high pressure piston has moved a certain distance to transfer fluid from the high pressure chamber to the brake mechanism. The prefill piston has a sealing land and a second land on either side of a sealing ring which is slidable in the stepped bore. The sealing land sealingly engages the sealing ring when the prefill piston moves to transfer fluid from the prefill chamber to the brake mechanism. The sealing land is spaced apart from the sealing ring by a distance which is greater than the distance between the groove and the inlet when the stepped piston is in its rest position.

DETAILED DESCRIPTION

Figure 1:
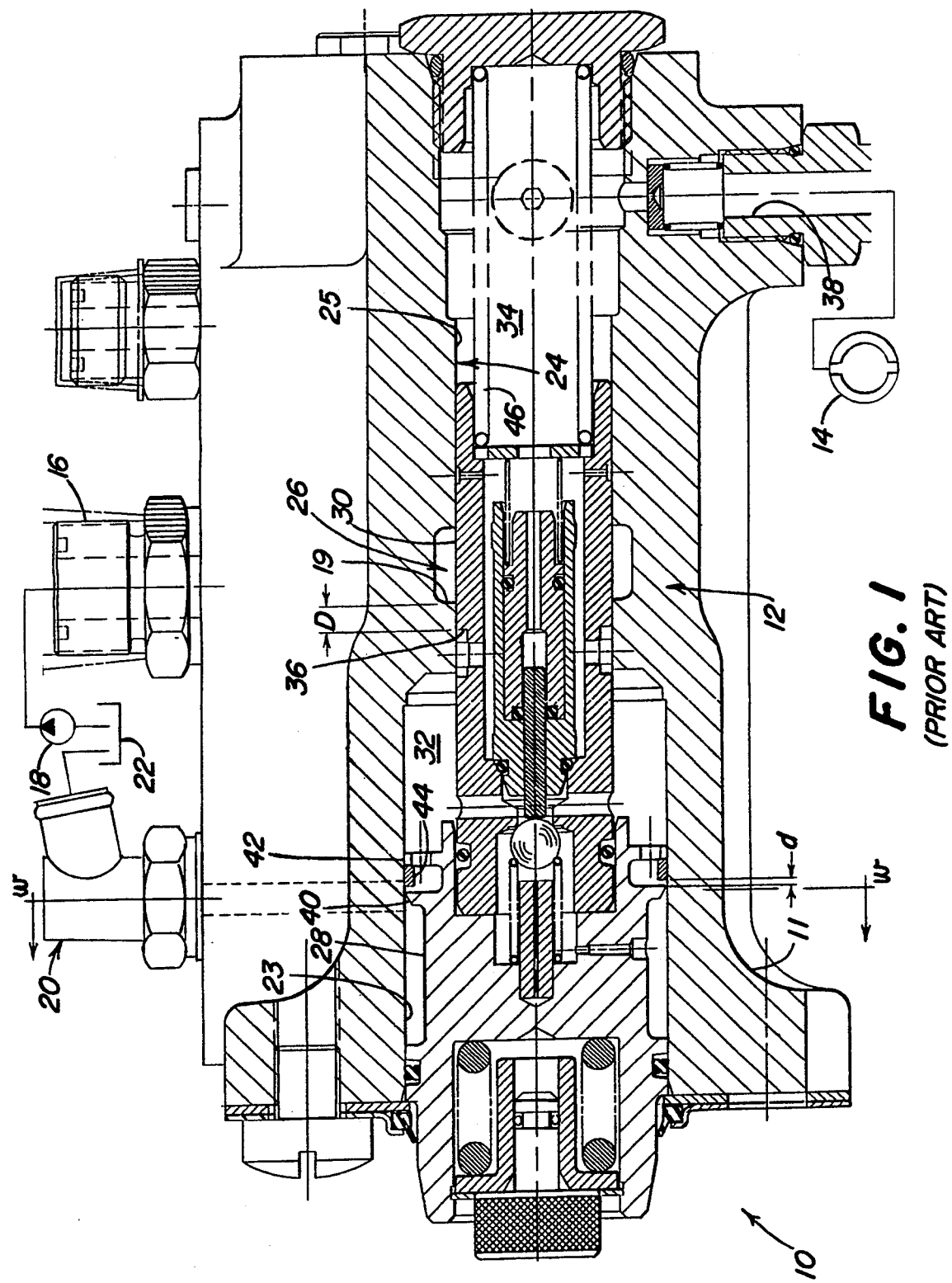
FIG. 1 is a cross-sectional view of a prior art two-stage brake valve.

Referring to FIG. 1, there is shown one side of a prior art dual two stage brake valve 10 a housing 11 which encloses a left two stage brake valve (not shown) and a right two stage brake valve 12 for communicating fluid pressure to a left brake mechanism (not shown) and right brake mechanism 14. Each brake valve has an inlet 16 for receiving pressurized brake fluid from a pump 18, an inlet groove 19 communicating with the inlet 16, a reservoir port 20 for communicating with a reservoir 22, a stepped bore 24 with large diameter section 23 and small diameter section 25. A stepped piston member 26 includes a larger diameter prefill piston 28 and a smaller diameter high pressure piston 30. The stepped bore 24 and the stepped piston member 26 form a high volume prefill chamber 32 and a high pressure chamber 34. The high pressure piston 30 has a groove 36 communicated with the brake mechanism 14 via outlet 38. The groove 36 communicates with the inlet 16 when the high pressure piston 30 has moved a certain distance D to transfer fluid from the high pressure chamber 34 to the brake mechanism 14. The prefill piston 28 has a sealing land 40 and a second land 42 on either side of a sealing ring 44 which is slidable in the bore 23. The sealing land 40 sealingly engages the sealing ring 44 when the prefill piston 28 moves through distance d, whereupon further movement of the prefill piston 28 to the right viewing FIG. 1 will transfer fluid from the prefill chamber 32 to the brake mechanism 14. A spring 46 is biased to urge the piston member 26 to the left to a rest position.

Figure 2:
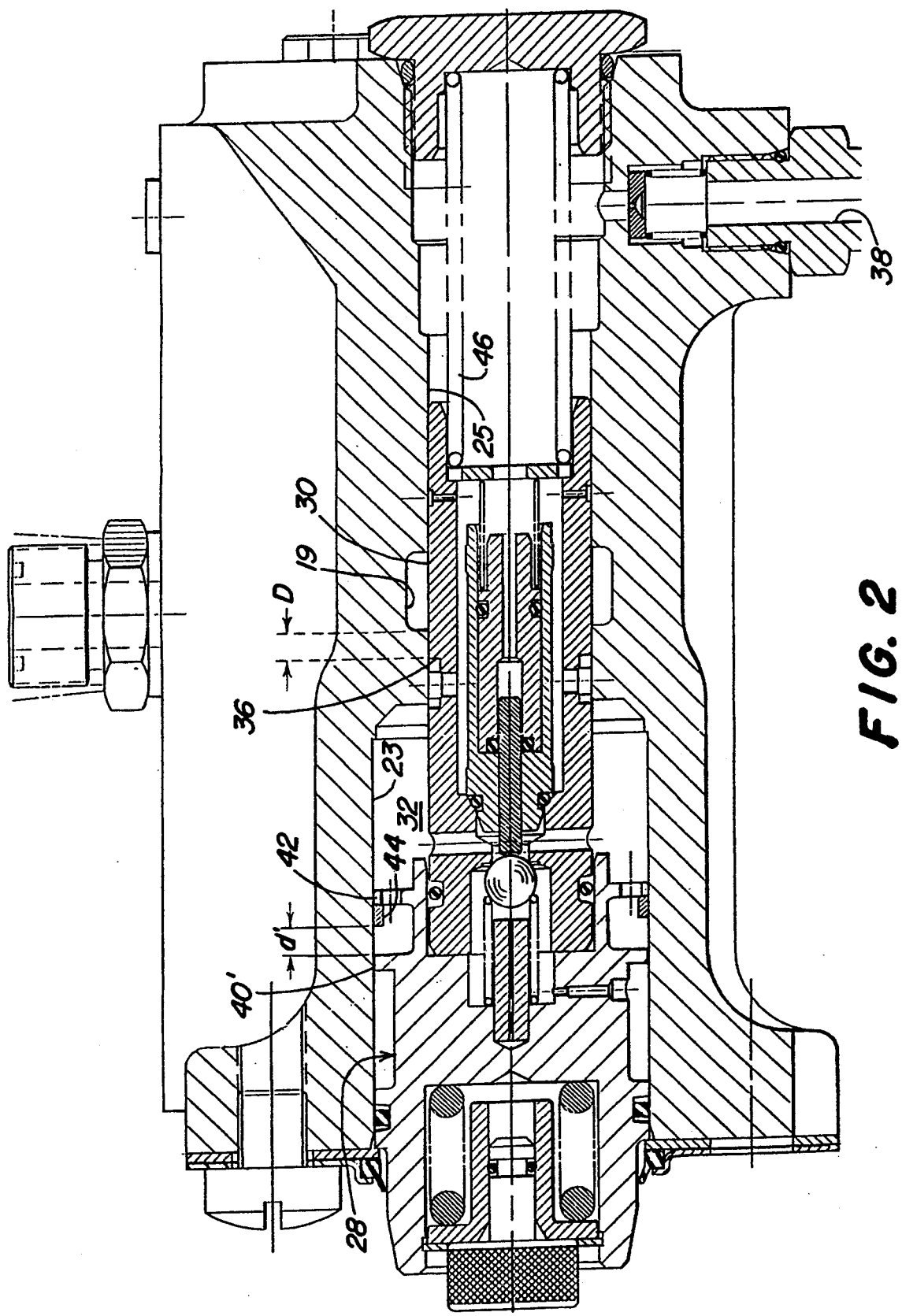
FIG. 2 is a cross-sectional view of a two-stage brake valve according to the present invention.

Referring now to FIG. 2, according to the present invention, the sealing land 40' is spaced apart from sealing ring 44 by a distance d' which is greater than the distance D between the edges of grooves 19 and 36 when the piston member 26 is in its rest position. Thus, land 40 sealingly engages the sealing ring 44 when the prefill piston 28 moves through distance d, whereupon further movement of the prefill piston 28 to the right viewing FIG. 1 will transfer fluid from the prefill chamber 32 to the brake mechanism 14. This prevents land 40' from engaging ring 44 during the time the piston member 26 travels from the rest position to the pressure metering position where grooves 19 and 36 start to overlap each other. As a result, during this initial piston travel, fluid will not be trapped in prefill chamber 32, thus avoiding a heavy pedal feel.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A two stage brake valve for communicating fluid pressure to a brake mechanism, the brake valve having an inlet for receiving pressurized brake fluid from a pump, a reservoir port, a stepped bore and a stepped piston member comprising a larger diameter prefill piston and a smaller diameter high pressure piston, the stepped piston being movable away from a rest position to transfer fluid to the brake mechanism, the stepped bore and the stepped piston forming a high volume prefill chamber and a high pressure chamber, the high pressure piston having a groove communicated with the brake mechanism, the groove being communicated with the inlet when the high pressure piston has moved a certain distance to transfer fluid from the high pressure chamber to the brake mechanism, the prefill piston having a sealing land and a second land on either side of a sealing ring which is slidable in the stepped bore, the sealing land being sealingly engagable with the sealing ring when the prefill piston moves to transfer fluid from the prefill chamber to the brake mechanism, characterized by:

the sealing land is spaced apart from the sealing ring by a distance which is greater than the distance between the groove and the inlet when the stepped piston is in its rest position.

* * * * *